No. 654,826. Patented July 31, 1900.
W. H. BROADHEAD.
POWER TRANSMITTING MECHANISM.
(Application filed June 26, 1899.)
(No Model.)
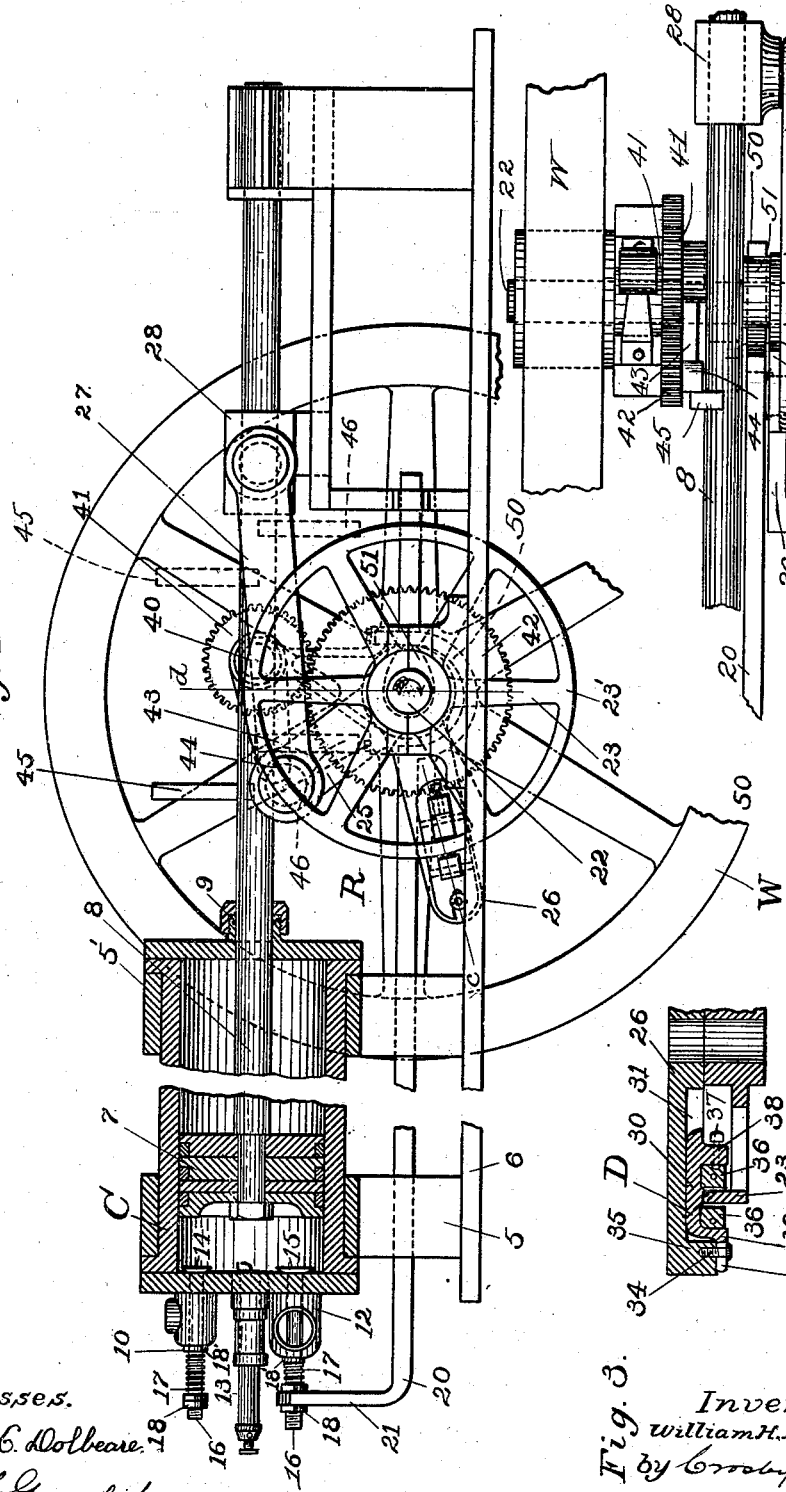
Witnesses.
George L. Dolbeare.
Fred S. Greenleaf
Inventor.
William H. Broadhead
by Crosby & Gregory.
Att'ys

UNITED STATES PATENT OFFICE.

WILLIAM H. BROADHEAD, OF SOMERVILLE, MASSACHUSETTS.

POWER-TRANSMITTING MECHANISM.

SPECIFICATION forming part of Letters Patent No. 654,826, dated July 31, 1900.

Application filed June 26, 1899. Serial No. 721,801. (No model.)

*To all whom it may concern:*

Be it known that I, WILLIAM H. BROADHEAD, of Somerville, county of Middlesex, State of Massachusetts, have invented an Improvement in Power-Transmitting Mechanism, of which the following description, in connection with the accompanying drawings, is a specification, like letters and figures on the drawings representing like parts.

This invention relates to power-transmitting mechanism; and the object of the invention is to provide a compact and light appliance of this character involving in its organization a minimum number of parts coöperating to produce a high degree of power.

The invention includes as one of its features in the embodiment thereof herein represented a motive agent including a power-transmitting member, a driving element, means for effecting the movement of said driving members, including a locking device, and means actuated by said power-transmitting member and operative to cause the reciprocation of said locking device between two points, both of which are located at one side of the dead-center line of said driving element, and these several parts may be of any suitable kind.

In the present instance I have represented the motive agent as consisting of a cylinder and the power-applying member as a piston therein provided with a rod, and the piston is propelled forward by the explosion of a hydrocarbon vapor ignited therein by a spark, which can be suitably produced. In the ordinary types of explosive-motors it is the custom to explode the vapor which operates the piston when the crank which receives its motion from the piston is at its dead-center or substantially near the same, and the momentum of the fly-wheel is depended upon to carry the crank beyond its dead-center. As is obvious, in such a case as this considerable power is wasted, the line of thrust being substantially against the dead-center of the crank when said crank is at its lowest efficiency.

By my improvement, however, this loss of power is not possible, as the locking device is supported for oscillation between two points, both of which are located at opposite sides of the dead-center line.

The invention includes as another of its features, in connection with a motor-vehicle having a power-applying member operative from a retractive position to its forward position by energy generated by said motive-agent, driving means for said power-applying member and means driven by said driving means for returning said power driving member to its retractive or primary position, thereby avoiding the necessity of independent mechanisms or parts for securing this last-named function.

In the drawings, Figure 1 is a side elevation of a motor, illustrating the same in the preferred embodiment thereof and showing the parts in full lines at their primary or initial positions and the cylinder being in section and broken apart and the ends brought together for economy in space. Fig. 2 is a top plan view of a portion of the mechanism controlled by the motive agent or cylinder. Fig. 3 is a horizontal section of a portion of the oscillating driver.

It is apparent that the motor is capable of a variety of uses, and it serves as an efficient medium for propelling a vehicle, and includes in its construction in the form thereof herein illustrated a cylinder, as C, supported by standards, as 5, rising from the bed or base plate 6. The cylinder is adapted to contain the piston 7, which is peripherally packed, as customary, and which is provided with a rod 8, extended through the stuffing-box 9. The other head of the cylinder is adapted to receive the supply and exhaust pipes 10 and 12, between which a sparking appliance, as 13, is disposed, that illustrated being of the electrical type.

The supply and exhaust valves are denoted by 14 and 15, respectively, and their stems 16 project through the supply and exhaust pipes and also through the rear head of the cylinder and are of substantially disk form and are adapted to close ports or passages in said head. The valves are held shut by the protractile coiled springs 17, which surround the valve-stems 16 and bear against the stops 18 on said stems and also against shoulders or offsets 18' upon the supply and exhaust pipes. The stops 18 are in the nature of nuts.

The means for operating the valve 14 to open the same and thereby admit vapor to be exploded in the explosion-chamber of the cylinder C are not herein illustrated, and they may be of any suitable type.

The exhaust-valve is operated by the rod 20, supported by suitable bearings upon the bed 6 and having at one end the transverse arm 21, adapted to receive the stem of the exhaust-valve and to be disposed between the nuts 18, which constitute the stop against which the blow-up spring acts.

The driving-shaft of the motor is denoted by 22, and it is supported for rotation by bearings upon the bed of the machine and has secured thereto the driving-wheel, which is rotated through the intervention of a device, hereinafter to be described, acting in the present case against the periphery or rim of said wheel 23.

The device which rotates the wheel 23 is in the nature of a rocker-arm substantially in the form of an angle-lever, the main arm 25 of which being represented as operated by the piston-rod 8 in such a manner that the point at which the power is applied to the arm 25 will always be at one side of the dead-center line of the wheel 23, which line is represented as being a vertical one, although it may extend in any other direction.

The auxiliary arm 26 is represented as carrying a pawl or dog which may be of any suitable type, but which is of the frictional kind, it having a jaw or jaws to engage the periphery or rim of the wheel for the purpose of rotating the same. While the auxiliary arm carries the dog or pawl for operating the wheel 23, it is evident that this is not essential, for said pawl or dog might be carried by the main arm.

The main arm 25 of the rocker is shown as connected by the link 27 with the hub or projection 28 upon the piston-rod 8, said link being pivoted to the respective parts.

In Fig. 1 the parts are represented by full lines as occupying their primary positions. When an explosion takes place behind the piston 7, the latter is driven forward, thereby moving the rod 8 in the corresponding direction, and consequently through the link 27 swinging the arm 25 from its primary position to the end of its advancing stroke, (represented by dotted lines in said figure,) and during the forward stroke of the rocker the pawl or dog carried by the auxiliary arm of the rocker by engaging the wheel 23 will rotate the same, and the pawl will be automatically freed from the wheel when the rocker has reached the end of its forward stroke, so that the rocker can be returned to its normal position, although of course the wheel 23 will continue to rotate.

The pawl or dog which operates the wheel 23, and consequently the shaft 22, to drive an appliance connected with said shaft is denoted in a general way by D, and it includes in its construction a body portion 30, adapted to fit within the recess 31 in the arm 26 and provided with an offset portion having a longitudinal slot 33 to receive the pivot-pin 34, carried by the projection 35 at the free end of the arm 26, and the construction specified permits a limited amount of longitudinal movement of the pawl. The pawl 30, which is in the nature of a gravity one, is provided with the jaws or blocks 36, the inner one being adjustable by the screw 37, passing through the lug 38 on said pawl, and by reason of this adjustment the grip of the inner jaw can be properly regulated to take up any wear by moving the inner block or jaw toward its companion. The working edges or faces of the blocks are adapted to pinch the rim 23' of the wheel 23 when the pawl D falls from a dead-center line intersecting the axis of the pivot or stud 34 and the shaft 22, so that when the rocker is operated in the manner hereinbefore specified it will serve, through the agency of the pawl, to rotate the wheel 23. The shaft 22 is provided with a balance-wheel W, the momentum of which is utilized to drive said shaft when the rocker has reached the end of its working stroke, as shown by dotted lines in Fig. 1. On the reverse or ineffective movement of the rocker the pawl carried by the auxiliary arm 26 can be swung to the dead-center line last referred to, whereby the jaws or blocks 36 will release the wheel 23 and not effect the proper action thereof. A second shaft is located at 40, mounted upon suitable bearings and having the gear 41 keyed thereto and which meshes with the gear 42, keyed to the shaft 22, the ratio between the gears being one to two. The shaft 40 is represented as provided with an actuating-arm 43, rigidly secured thereto, and which is operated through the agency of the meshing gears 42 and 41, respectively, and this actuating-arm in the present instance controls the action of the piston, it being shown provided at its free end with a projection or tappet 44, adapted to engage the offsets 45 and 46, secured at different places to the piston-rod 8 to move said rod back and forth.

In Fig. 1 the oppositely-disposed offsets 45 and 46 are represented as occupying their primary positions at the left in said figure, the projection 44 of the actuator 43 being in engagement with the upper end of the offset 46 and below the lower end of the offset 45. When an explosion takes place, the piston 7 will be advanced to the full end of its stroke and will serve, through the intermediate connections, to operate the rocker-arm, whereby the wheel 23 will be rotated by the pawl D, thereby through the meshing gears causing the rotation of the shaft 40, and consequently the actuator 43. As the actuator 43 rotates the projection 44 thereon, being in contact with the left-hand face of the offset 46, will thrust said offset to the right, the projection riding down said face and reaching the end of the same when the offset is in a position exactly intermediate the ends of its stroke. When the offset 46 is in such intermediate position, the projection 44, which has then reached a position slightly to the right of a vertical position, will pass up said face and out of contact with the same, said offset 46 in the meantime having reached the end of its stroke, as indicated by the dotted lines at the right in Fig. 1. When the piston 7 has reached the end of its stroke, the offset 45 will occupy a position shown by the dotted lines in Fig. 1, and when the projection 44 of the actuator 43 passes out of contact with the offset 46 it will strike the right-hand face of the offset 45, which is disposed in its path, and will ride up the same until it reaches nearly the upper end of said face, at which point the offset 45 will be in an intermediate position. Beyond this point the projection 44 will ride down the offset 45 until the latter has reached its primary position, the piston 7 being of course forced rearward. Therefore it will be understood that the actuator 43, which is operated from the piston, serves to actuate the piston rearwardly. The organization is such that a very powerful force is applied to the wheel 23 and also to the balance-wheel W, so that I can utilize the effect of said balance-wheel, due to its momentum, to cause the operation of the piston-rod 8 and the other parts connected therewith in regular or predetermined order. The ratio of the gears 42 and 41, as hereinbefore set forth, is two to one, by reason of which the arm 43 will be rotated twice to each complete rotation of the shaft 22, which receives its rotation from the explosion. Therefore the actuator 43 by successively engaging the offsets 46 and 45 imparts a full bevel stroke to the piston-rod after the explosion has been made and while the shaft 22 of course has only made a half-rotation. By varying the size of the gears 42 and 41 the stroke of the piston can be otherwise regulated.

The connecting-rod 20 has a crank portion 50 extending around the driving-shaft 22, and the connecting-rod is operated by the actuator 51 upon the main shaft 22. In Fig. 1 the actuator 51 is shown as being in contact with the right-hand branch or part of the crank portion or yoke 50. On the rotation of the shaft in the direction of the arrow (indicated in Fig. 1) the actuator 51 will be correspondingly moved and will ride in contact with the inside face of the yoke 50, during which time the exhaust-valve 15 will be held closed. When, however, the actuator-arm 51 passes above the yoke portion, the spring 17 will force the exhaust-valve open. On the continued movement of the actuator-arm it will again come in contact with the yoke portion 50 to close the exhaust-valve.

While I have hereinbefore described my improvements as applied to an explosive-engine, it is evident that they may be used with equal advantage in connection with other kinds of motors, and it will be understood that the invention is not limited to the exact elements or arrangement of parts hereinbefore specified, for these may be variously modified within the scope of the accompanying claims.

Having described my invention, what I claim as new, and desire to secure by Letters Patent, is—

1. In a power-transmitting mechanism, a cylinder, a piston in said cylinder provided with a rod, driven mechanism actuated by said rod, and means operated by said driven mechanism for operating the piston.

2. In a power-transmitting mechanism, a cylinder, a piston in said cylinder provided with a rod, driven mechanism including a train of differential gears actuated by said rod, and means operated by said driven mechanism for operating the piston.

3. In a power-transmitting mechanism, a cylinder, a piston located in said cylinder and provided with a rod, a two-to-one train of intermeshing gears, connections between the rod and the large gear for operating said large gear, and means controlled by the small gear for operating the piston.

4. In a power-transmitting mechanism, a motive agent including a power-applying member operative from its backward to a forward position, driven mechanism operated by said power-applying member on its forward stroke, and means operated by said driven means for imparting a return stroke to the power-applying member.

5. In a power-transmitting mechanism, a motive agent including a power-applying member operative from a backward to a forward position, driven means operated by a power-applying member on its forward stroke, and means operated by said driven means for reciprocating said power-applying member and for also returning the same to its initial position.

6. In a power-transmitting mechanism, a motive agent including a power-applying member, a shaft, a wheel carried by said shaft, a rocker having a pawl for operating the wheel and connected with the power-applying member, and means operated by said shaft for operating the power-applying member.

7. In a power-transmitting mechanism, a cylinder having valve mechanism and provided with a piston equipped with a rod, driven mechanism operated by the rod, a member for governing the valve mechanism and controlled by said driven mechanism, and means operated by the driven mechanism for actuating the piston-rod.

8. In a power-transmitting mechanism, a cylinder, a piston located in said cylinder and provided with a rod, a driven element, means for effecting the movement of said driven element and including a rocking device, means actuated by said power-transmitting member and located to act against said rocking device, and to cause the reciprocation of the same at one side only of a dead-center line, and means operated by said driven element for returning the piston-rod to its initial position.

9. In a power-transmitting mechanism, a cylinder, a piston located in said cylinder and provided with a rod, said rod having an offset, a driven element, means for effecting the movement of said driven element and including a rocking device, means actuated by said power-transmitting member and located to act against said rocking device and to cause the reciprocation of the same at one side only of the dead-center line of said driven element and an arm connected with and operated by said driven element and having a projection adapted to engage said offset to return the piston to its initial position.

10. In a power-transmitting mechanism, a cylinder, a piston in said cylinder provided with a rod, driven mechanism connected with and actuated by said rod, two offsets on the piston-rod, and an arm connected with said driven mechanism and adapted to engage said offsets to reciprocate the piston.

In testimony whereof I have signed my name to this specification in the presence of two subscribing witnesses.

WILLIAM H. BROADHEAD.

Witnesses:
FREDERICK L. EMERY,
HEATH SUTHERLAND.